United States Patent [19]
Wilson et al.

[11] Patent Number: 6,064,535
[45] Date of Patent: May 16, 2000

[54] SERVO ERROR RESPONSE SYSTEM ON A MAGNETIC DISK DEVICE

[75] Inventors: Aaron W. Wilson; Russell B. Josephson, both of Berthoud; Wen Lin, Niwot; Wayne A. Thorsted, Longmont, all of Colo.

[73] Assignee: STMicroelectronics, N.V., Netherlands

[21] Appl. No.: 08/911,097

[22] Filed: Aug. 14, 1997

[51] Int. Cl.[7] .................................................. G11B 15/04
[52] U.S. Cl. ................................ 360/60; 360/25; 360/31; 360/69
[58] Field of Search ................................ 360/60, 25, 31, 360/69, 68

[56] References Cited

U.S. PATENT DOCUMENTS 4,092,682  5/1978  Andrews, Jr. et al. .................... 360/77
4,809,091  2/1989  Miyazawa et al. ........................ 360/48

*Primary Examiner*—Thang V. Tran
*Assistant Examiner*—Joseph M Vann
*Attorney, Agent, or Firm*—Theodore E. Galanthay; Lisa K. Jorgenson; William J. Kubida

[57] ABSTRACT

A system for halting operation of a hard disk controller when a write operation occurs during a servo positioning error condition including a memory cell for retaining an indication of whether a write operation occurred during the previous servo sector. A memory cell, such as a flip flop, is set on any occurrence of a write operation. With the reading of a next servo field, the output of the first flip flop is latched to a second flip flop. During a present servo sector, a servo positioning error signal is logically AND'ed with a write gate active signal where the write gate active signal is enabled if write gate is active in the present servo sector or write gate was active in the previous servo sector (as indicated by the output from the second flip flop.

16 Claims, 4 Drawing Sheets

SERVO ERROR RESPONSE SYSTEM ON A MAGNETIC DISK DEVICE

FIELD OF THE INVENTION

This invention relates to the field of disk drive systems, and in particular to a servo error response system for stopping operation of a hard disk controller.

PROBLEM

A specific point on the concentric tracks of a magnetic disk is identified by a unique address that typically includes a cylinder number, a head number, and data sector number. To help position a read/write head over a specific point on the magnetic disk, special markers called servo fields are located at regularly spaced intervals throughout the recording surface of the magnetic disk. The servo fields each contain, for example, a cylinder and servo burst number that are used to orient the read/write heads so that a target address on the magnetic disk can be located. The cylinder and head portion of a target address identify a specific track on the magnetic disk and the data sector portion of a target address identifies a specific data sector on the track. A servo positioning error occurs when the read/write heads are not properly aligned with respect to the surface of the magnetic disk. A servo positioning error is detected by servo controller logic in response to reading the servo fields.

A servo controller reads the servo fields and processes the information contained in each servo field to check the proper positioning of the read/write heads with respect to the surface of the magnetic disk. When the read/write heads become misaligned with respect to the surface of the magnetic disk, a servo positioning error has occurred. The occurrence of a servo positioning error is detected by the servo controller reading and processing the servo field next encountered after the occurrence of the servo positioning error. The servo controller generates a servo positioning error signal in response to detection of a servo positioning error.

One problem with writing data in a data sector is that a servo positioning error may not be detected until after a write operation, or part of a write operation, has completed. If a write operation occurs during a servo positioning error the data may be written at the wrong location on the surface of the magnetic disk. Thus it is important to halt any write operation while a servo positioning error persists. A write operation is stopped by halting operation of the Hard Disk Controller ("HDC"). It is undesirable, however, to stop the hard disk controller unconditionally on any occurrence of a servo positioning error because the servo positioning error may or may not apply to any data written. Operation of the hard disk controller need not be halted, for example, when the read/write heads encounter a known defective sector. Rather, the defective sector should be simply skipped over without stopping the HDC even though a servo error exists.

Present magnetic disk control devices address this problem by qualifying the servo error signal with the write gate signal where the write gate signal is active whenever data is actually being written. However, a problem still exists with this approach because a write operation might conclude after the occurrence of the servo positioning error, but before the activation of the servo positioning error signal, and this data is written incorrectly. Since write gate was never asserted at the same time as the servo positioning error signal, no termination of the write operation occurs and it is left to firmware to detect the error and stop the HDC. This involves the use of valuable processor time.

There exists a need for a servo positioning error detection system that stops operation of the HDC when data is being or has been written during a servo positioning error but does not stop operation of the HDC unnecessarily.

SOLUTION

The above-described problems and others are solved by the servo positioning error response system of the present invention. The system of the present invention stops operation of the HDC when and only when data is being or has been written during a servo positioning error. Stopping the HDC is necessary to capture information about the error and where the error occurred. A write gate memory cell is used to store information about the type of HDC operation performed during the previous servo sector. A servo positioning error detected during a present servo sector and a write operation during the previous servo sector result in halting the HDC. This occurs even if there is no write operation during the present servo sector. Thus fewer operations are left to the firmware as a result of a servo positioning error resulting in more efficient operation of the disk system.

There is a time lag between when a servo positioning error occurs and when a servo positioning error signal is generated. The present invention 'remembers' if a write operation was performed during the previous servo sector. If a servo positioning error signal is generated, the present invention operates to halt operation of the HDC if a write is being performed during the current servo sector or if a write operation was performed during the previous servo sector.

Any type of write gate memory cell is used by the present invention to store an indication of whether a write operation was performed during the previous servo sector. An advantage of the present invention is the ability to hardwire the decision to halt the HDC operation due to a servo positioning error. Thus, a memory cell whose operation requires no processor overhead is particularly advantageous. One embodiment of the present invention utilizes two D flip flops as a memory cell. Each time a servo field is read the flip flop pair provides an active output if write gate was active during the previous servo field. This signal is conditioned with the servo position error signal to produce a write termination signal in the event a servo position error condition exists and a write operation occurred during the previous servo sector.

DETAILED DESCRIPTION

Figure 1:
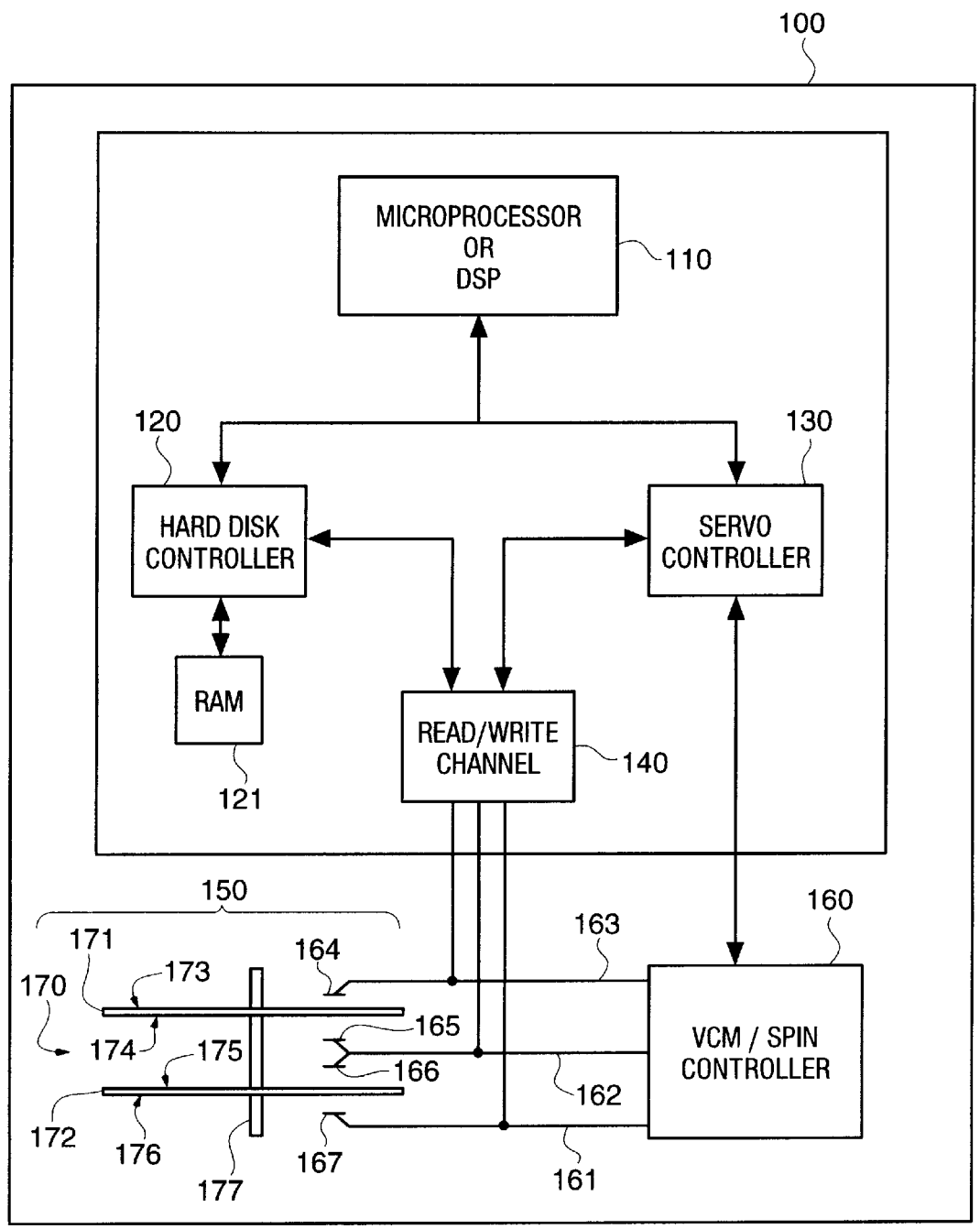
FIG. 1 illustrates an example system level view of a magnetic disk device architecture in block diagram form.

Magnetic Disk Device Architecture—FIG. 1

FIG. 1 illustrates a system level architecture view of a magnetic disk device 100 in block diagram form. The primary components in magnetic disk device 100 include, but are not limited to, disk control components 110–140 and operational disk components 150–160. Disk control components 110–140 include, but are not limited to, a microprocessor or Digital Signal Processor (DSP) 110, a Hard Disk Controller (HDC) 120 with accompanying RAM 121, a servo controller 130, and a read/write channel controller 140. The microprocessor or DSP 110 is the highest level of control and coordination for all disk device activities and read/write operations executed by the disk control components. HDC 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo field information and controls positioning activities of read/write heads. Read/write channel 140 passes data between the operational disk components 150–160 and the disk control components 110–130 for each read/write operation.

Operational disk components 150–160 include, but are not limited to, a Head and Disk Assembly (HDA) 150 that includes magnetic disk 170 and read/write heads 164–167, a Voice Coil Motor (VCM)/spin controller 160 that is operatively connected to access arms 161–163 through a voice coil motor (not shown apart from VCM/spin controller 160). Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. VCM/spin controller 160 also manages the movement of spindle 177. Read/write heads 164–167 are positioned to fly just off the recording surfaces 173–176 respectively when the magnetic disk 170 is spinning. Although other magnetic disk device architectures are possible other than the architecture described above, no limitation is intended or implied with respect to the present invention. The present invention is applicable to any magnetic or optical disk regardless of a single platter or multiple platter implementation or a removable medium or floppy disk medium.

Figure 2:
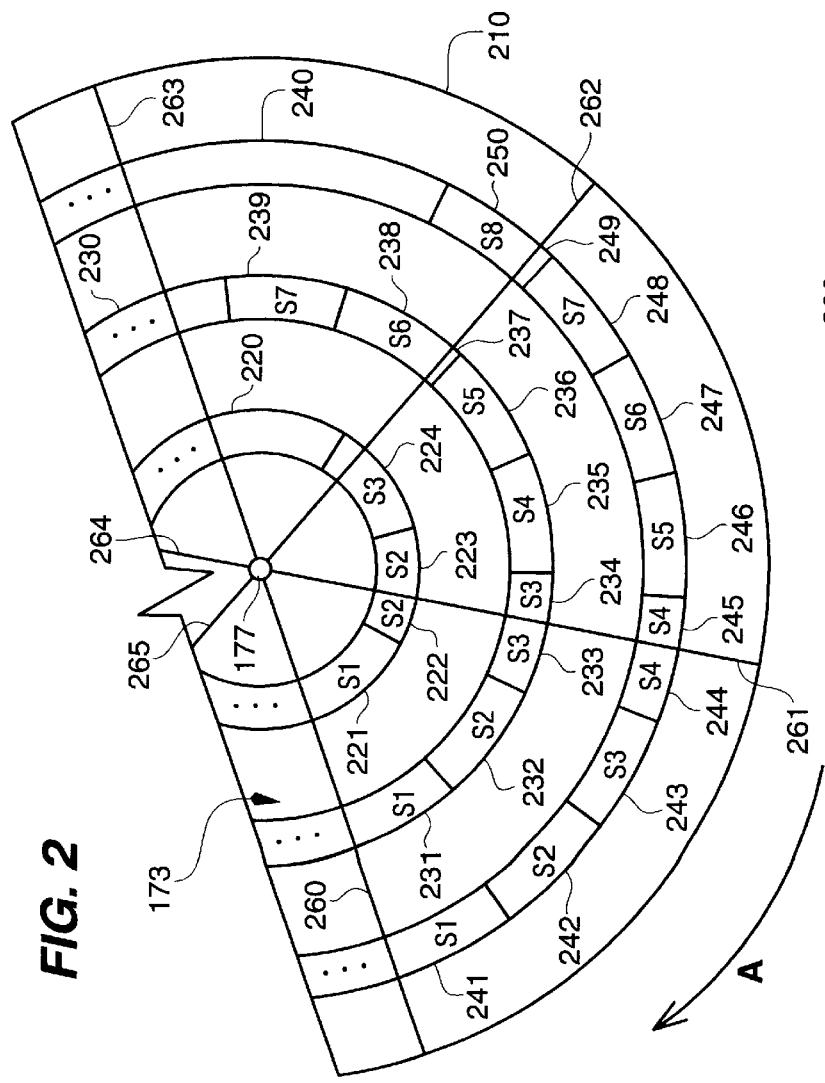
FIG. 2 illustrates a top view of a track and sector format on a magnetic disk device recording surface.

Magnetic Disk Format—FIG. 2

FIG. 2 illustrates the track and sector format for a recording surface such as recording surface 173 of magnetic disk 170. Recording surface 173 comprises a plurality of concentric tracks of successively increasing size from the center spindle 177 to the outer edge 210. The present illustration focuses on tracks 220, 230, and 240. A cylinder is the set of all tracks of a given size from each recording surface of each platter in magnetic disk 170. Thus, if track 230 is the 6th concentric track of recording surface 173 and each recording surface of magnetic disk 170 has a 6th concentric track, then there exists a 6th cylinder for magnetic disk 170 that comprises each 6th concentric track of each recording surface. With a single motion of access arms 161–163, each read/write head 164–167 can be simultaneously positioned to read and/or write data from any one or more of the recording surfaces 173–176 in cylinder 6. If track 230 is the 6th track and read/write heads 164–167 are numbered 00 through 03 respectively, then the cylinder CC and head HH address for track 230 on recording surface 173 would be "0600".

Figure 3:
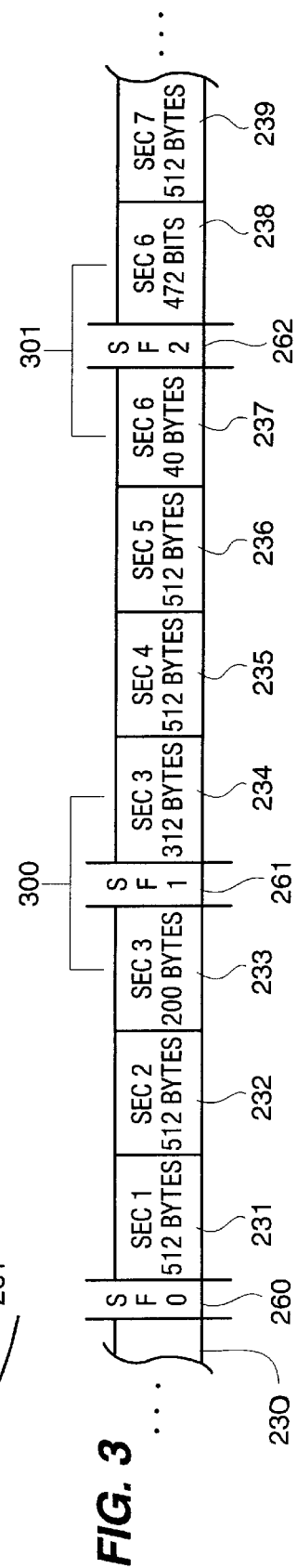
FIG. 3 illustrates a detailed view of a track and sector format in block diagram form.

Each track on each recording surface such as recording surface 173 includes regularly spaced and radially aligned servo fields 260–265. The physical orientation of servo fields 260–265 and tracks 220, 230 and 240 are shown in FIG. 2 on a straight radial alignment. Those skilled in the art recognize that, for a disk system using tone arm actuators, the tracks are arranged along radii of arcs matching the motion of the tone arm to which read/write heads 164–167 are attached. As shown in FIG. 3, servo fields 260–265 are actually fields of data rather than simply lines or discrete markings. Each servo field that resides on each track contains, among other things, specific cylinder, head, and servo burst number information that uniquely identifies the location of each servo field. For purposes of the present illustration, servo fields 260–265 of FIG. 2 are numbered SF0–SF5 of FIG. 3 respectively.

Data sectors, also known as sectors, blocks, or records, are fixed length addressable subdivisions of a track that typically contains data that is written to the disk. For example, a typical data sector size might be 512 bytes long. To simplify the discussion accompanying FIGS. 2–3, the data sectors 221, 231, and 241 are identified as sector number S1 that each begin on an even full data sector boundary from servo field 260. A given track does not always begin with data sector 1 at servo field 0 for reasons beyond the scope of this discussion.

Detailed Track and Sector Format—FIG. 3

FIG. 3 illustrates a segment of track 230 that includes servo fields 260–262 and data sectors 231–239. Specifically, data sectors 231–232, 235–236, and 239 are shown as being full sectors of 512 bytes each for example purposes. Split data sector 300 contains a leading or first data sector segment 233 having 200 bytes and a trailing or second data sector segment 234 having the remaining 312 bytes of an otherwise full 512 byte data sector. Similarly, split data sector 301 contains a leading or first data sector segment 237 having 40 bytes and a trailing or second data sector segment 238 having the remaining 472 bytes of an otherwise full 512 byte data sector.

Write Operations and Servo Positioning Errors—FIGS. 4–6, and 9

Figure 4:
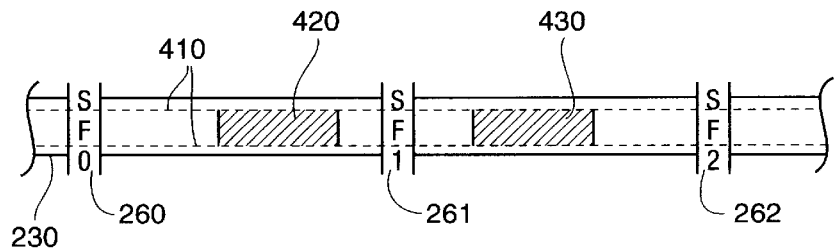
FIGS. 4–6 illustrate a detailed view of a track and data written thereon.
Figure 5:
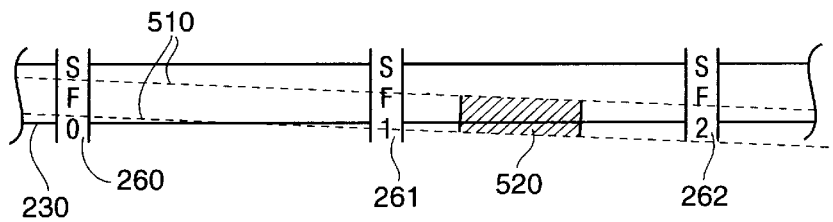
Figure 6:
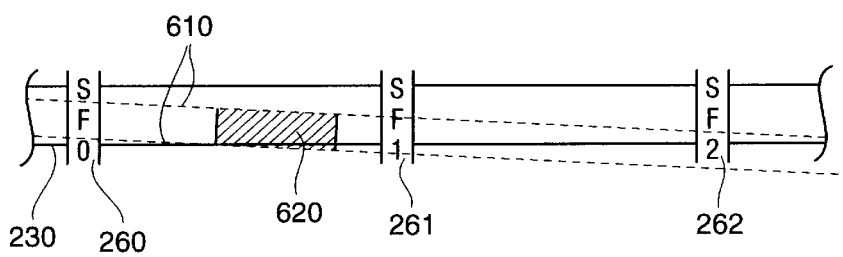

FIGS. 4–6 illustrate a segment of track 230 overlayed with an indication of the physical position of one of read/write heads 164–167 with respect to track 230 as recording surface 173 moves with respect to read/write heads 164–167. Each of FIGS. 4–6 illustrates a different condition under which data is written in track 230. Read/write head alignment indicators 410, 510 and 610 indicate the extent to which the read/write head properly tracks along track 230. Alignment indicators 410, 510 and 610 are shown only for purposes of discussion and do not represent a physical element on surface 173. A properly aligned read/write head is indicated by an alignment indicator within the boundary of track 230. With respect to FIG. 4, the read/write head is properly aligned with respect to track 230 for entirety of the segment of track 230 shown in FIG. 4, as illustrated by alignment indicator 410. Data sector 420 is written on track 230 between servo field 260 and servo field 261. Data sector 430 is written on track 230 between servo field 261 and servo field 262. Data sectors 420–430 are written in the correct physical location on track 230.

FIG. 5 illustrates the same segment of track 230 as shown in FIG. 4. However, in the example of FIG. 5 the read/write head becomes increasingly mis-aligned with respect to track 230 as the read/write head passes over servo fields 260–262, as indicated by alignment indicator 510. Servo field 260 is read and processed by servo controller 130 and no servo positioning error is detected since the read/write head is properly aligned at this point. However, by the time the read/write head passes over servo field 261, the read/write head is out of alignment with respect to track 230. This servo positioning error is detected when servo controller 130 processes servo field 261. A servo positioning error signal is therefore generated by servo controller 130. There is no need to halt operation of HDC 120 until and unless a write operation occurs while the servo positioning error signal persists. Present positioning error response systems logically AND the servo positioning error signal with write gate to produce a write termination signal. Thus when HDC 120 activates write gate to begin writing data sector 520, a write termination signal halts operation of HDC 120. Thus, data sector 520, although shown in FIG. 5, is not actually written since operation of HDC 120 is halted before the write operation.

FIG. 6 illustrates the same segment of track 230 as shown in FIGS. 4–5. In the example of FIG. 6 the read/write head becomes increasingly mis-aligned with respect to track 230 as the read/write head passes over servo fields 260–262, as indicated by alignment indicator 610. Servo field 260 is read and processed by servo controller 130 and no servo positioning error is detected since the read/write head is properly aligned at this point. Data sector 620 is written after servo field 260 and prior to servo field 261. When the read/write head passes over servo field 261, the read/write head is out of alignment with respect to track 230. This servo positioning error is detected when servo controller 130 processes servo field 261. A servo positioning error signal is therefore generated by servo controller 130. Present positioning error response systems logically AND the servo positioning error signal with write gate to produce a write termination signal. There is no write operation performed between servo field 261 and servo field 262 thus, in present positioning error response systems, there is no write termination signal generated. The present invention, however, 'remembers' that a write operation occurred in the servo sector just prior to the servo sector in which was generated the servo error positioning signal and operates to halt operation of HDC 120. This allows for a retry of the write operation to begin without utilizing any processing time of microprocessor 110.

Figure 9:
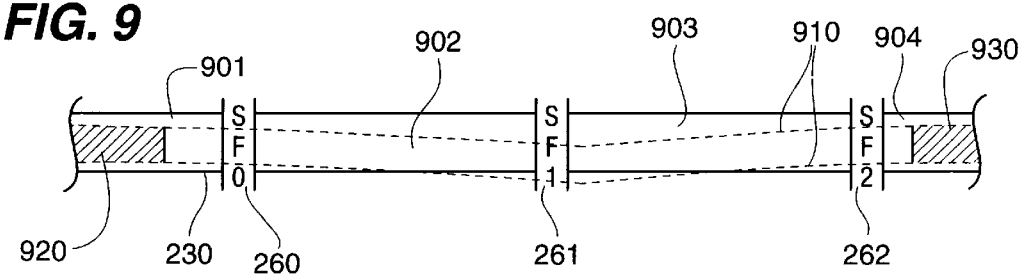
FIG. 9 illustrates another detailed view of a track and data written thereon.

FIG. 9 illustrates the segment of track 230 shown in FIGS. 4–6. In the example of FIG. 9 there is a servo positioning error detected when servo field 261 is read. The servo positioning error may be due to a misalignment of the read/write heads with respect to track 230, as indicated by alignment indicator 910, or may, for example, be due to a servo defect indicated by servo field 261. Regardless of the type of error indicated by servo field 261, no data is written in the servo sectors immediately preceding (servo sector 902) and following (servo sector 903) servo field 261. When servo field 262 is read, the servo positioning error clears and normal operation of the device continues. Data sector 920 is written in servo sector 901 and data sector 930 is written in servo sector 904. The present invention ensures that operation of HDC 120 continues unabated through servo sectors 901–904 even though a servo error is identified when servo field 261 is read. It is unnecessary to halt operation of HDC 120 when the servo error is detected at servo field 261 since no data is written in the adjacent servo sectors 902–903.

Figure 8:
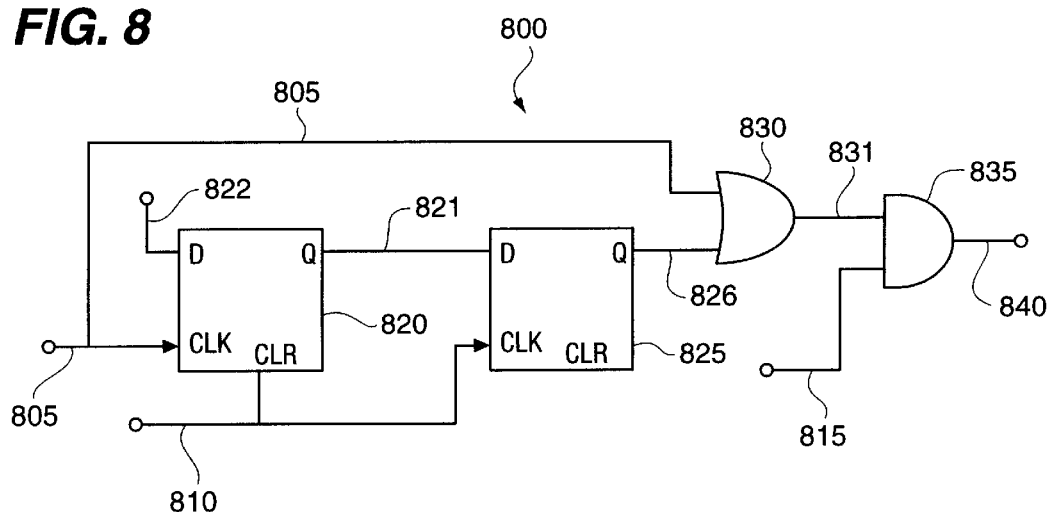
FIG. 8 illustrates a schematic of an exemplary embodiment of the servo positioning error response system of the present invention.
Figure 7:
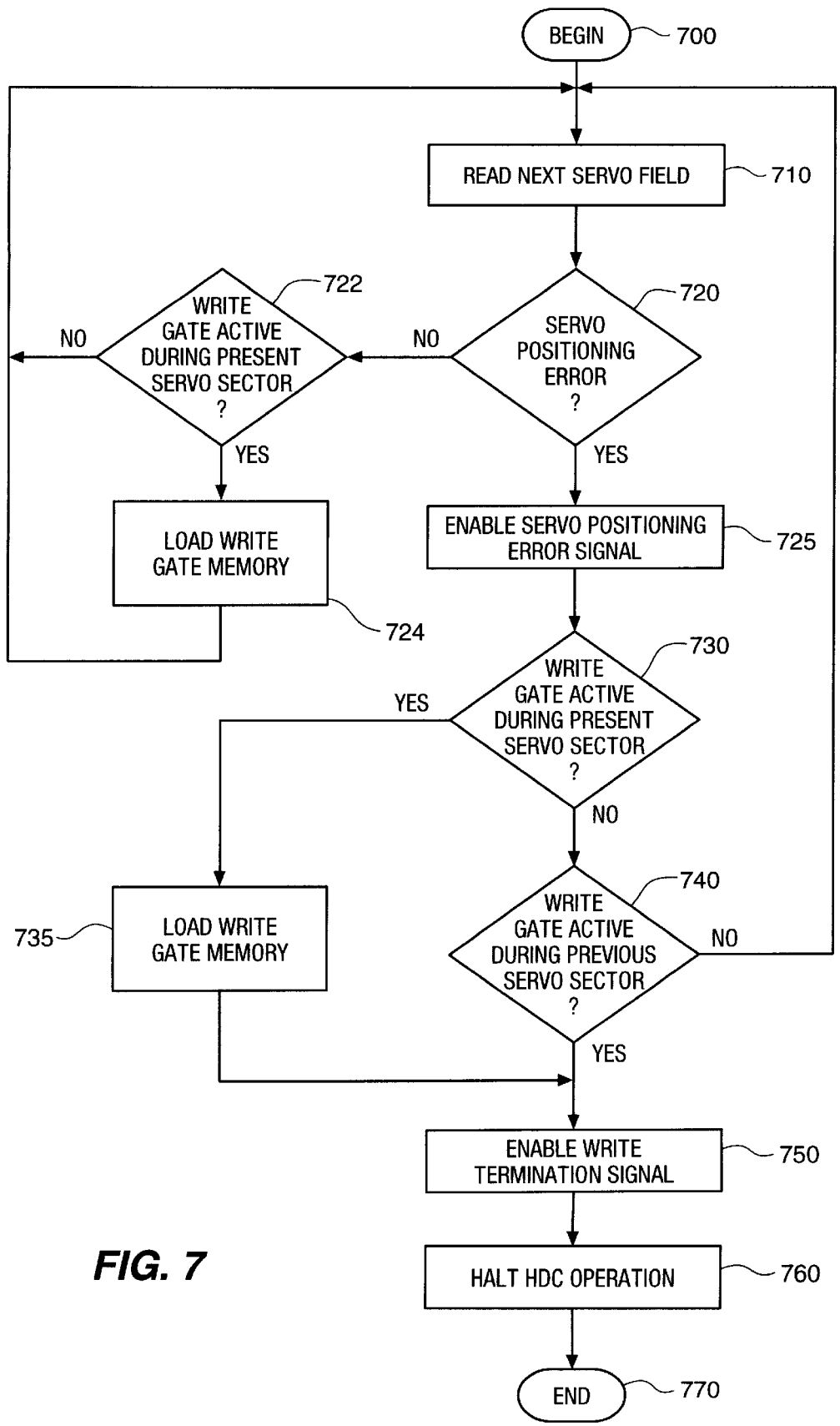
FIG. 7 is a flow chart of logic used to implement the present invention.

Servo Positioning Error Response System FIGS. 7–8

FIG. 7 is a flow chart illustrating the steps 700–770 implemented by the servo positioning error response system of the present invention. Steps 700–770 may be implemented, for example, as processing steps in microprocessor 110. Preferably, however, steps 700–770 are implemented in hardware such as, for example, within servo controller 130. Processing begins with step 700 which represents the initiation of operation of HDC 120 of hard disk system 100. Processing continues to step 710.

During step 710 the next encountered servo field is read. As noted with respect to FIGS. 1–6, disk system 100 reads and processes each servo field as a means of maintaining proper alignment between read/write heads 164–167 and surfaces 173–176, respectively. After a servo field is read, processing continues to decision block 720.

Decision block 720 operates to determine if a servo positioning error exists based on the servo field read during step 710. Servo controller 130 processes the servo field information read during step 710 and determines if there is a servo positioning error. If there is no servo positioning error, then processing continues to decision block 722. Decision block 722 operates to determine if write gate is active during the present servo sector. If yes then processing continues to step 724 where the write gate memory is loaded. Otherwise the write gate memory is cleared and the processing returns to step 710 where the next servo field is read. If there is a servo positioning error determined by operation of decision block 720 then processing continues to step 725.

During step 725 the servo positioning error signal is enabled by servo controller 130 and processing then continues to decision block 730. Decision block 730 determines if write gate is active during the present servo sector. Write gate is active whenever HDC 120 performs a write operation on disk 170. If write gate is active during the present servo sector then processing continues to step 735 otherwise processing continues to decision block 740. If write gate is active during the present servo sector in which the servo positioning error signal is enabled then operation of HDC 120 is halted. Step 735 loads the write gate memory so that it can be determined on the next pass through steps 700–770 that write gate was enabled during the previous servo sector. Processing continues from step 735 to step 750 where the write termination signal is enabled. With reference to FIG. 1, the write termination signal is output from servo controller 130, in the case of a hardware implementation of the present invention, and input to HDC 120.

If during decision block 730 it is determined that write gate is not active during the present servo sector then processing continues to decision block 740. Decision block 740 operates to determine if write gate was active during the previous servo sector. This is done be utilizing the content of the write gate memory. If the content of the write gate memory indicates that write gate occurred during the previous servo sector then processing continues to step 750 where the write termination signal is enabled. If write gate was not active during the previous servo sector then processing returns to step 710 where the next servo field is read. Processing continues from step 750 where the write termination signal is generated to step 760.

The write termination signal is generated during step 750 when a servo positioning error signal and write gate occur during the same servo sector or when a servo positioning error signal occurs during one servo sector and write gate was active during the previous servo sector. In both cases processing continues to step 760 where the write termination signal from servo controller 130 to HDC 120 halts operation of HDC 120. Microprocessor 110 then operates to direct a retry of the write operation by system 100. Those skilled in the art of disk drive design and operation understand the necessity of a retry operation where a servo positioning error has occurred during a write operation. The details of a retry are beyond the scope of this discussion. Processing concludes with element 770 which is representative, for example, of the halting of HDC 120. When a retry begins or HDC 120 otherwise resumes operation, processing of steps 700–770 begins anew.

FIG. 8 is a schematic of a servo positioning error response system 800. System 800 is one possible embodiment of the present invention. Those skilled in the art recognize that multiple implementations of the concepts of the present invention are possible. Three signals are used as inputs to system 800 and one signal is output from system 800. The input signals are write gate over path 805, servo burst indication over path 810 and servo positioning error signal over path 815. Write termination signal is output from system 800 over path 840. Write gate over path 805 is enabled each time a write operation is performed. Servo burst indication signal over path 810 is enabled each time a servo field is read. Servo positioning error signal over path 815 is enabled each time a servo positioning error is detected.

Any occurrence of write gate is latched into flip flop 820. This occurs because the data input of the flip flop 820 is held in an active state (i.e., a state indicative of the occurrence of the write operation) by path 822. During the next servo sector the output of flip flop 820 is latched into flip flop 825 because of the servo burst indication signal being enabled over path 810. This clears flip flop 820 and latches the output of flip flop 820 into flip flop 825. Therefore the output of flip flop 825 over path 826 is active if write gate occurred in the servo sector prior to the present servo sector. The output of flip flop 825 over path 826 is input to one input of OR gate 830. The other input to OR gate 830 is write gate over path 805. The output of OR gate 830 over path 831 is enabled if write gate is active during the current servo sector or if write gate was active during the previous servo sector. The output of OR gate 830 is applied to one input of AND gate 835. The servo positioning error signal over path 815 is applied to the other input of AND gate 835. Thus the output of AND gate 835, the write termination signal, is active whenever there is a servo positioning error and write gate is active during the current servo sector or was active during the prior servo sector. The write termination signal over path 840, generated as an output from servo controller 130, is applied as an input to HDC 120.

Flip flops 820, 825 operate as the write gate memory discussed with respect to FIG. 7. Those skilled in the art recognize that any type of memory cell could be used in place of flip flops 820, 825 to accomplish the same result of 'remembering' if write gate was active during the previous servo sector. Likewise any suitable logic gate combinations could be used or, as noted above, the steps of the present invention could instead be implemented as a series of computer-executable steps.

It is to be expressly understood that the claimed invention is not to be limited to the description of the preferred embodiment but encompasses other modifications and alterations within the scope and spirit of the inventive concept.

What is claimed is:

1. A system for halting operation of a hard disk controller during a servo positioning error, comprising:

means for determining when a servo positioning error has occurred;

means responsive to said determining means for generating a servo positioning error signal during a present servo sector if a servo positioning error exists;

means for performing a write operation during the present servo sector; memory means for storing an indication of whether write operation occurred during a previous servo sector;

means responsive to said memory means and said performing means for generating the write gate active signal if a write operation occurred during the present serve sector or the previous servo sector; means responsive to said servo error positioning signal and said write gate active signal for generating a write termination signal; and means responsive to said write termination signal for halting operation of said hard disk controller.

2. The system of claim 1 wherein said means for determining when a servo positioning error has occurred is a servo controller associated with said hard disk controller wherein said servo controller interprets each servo field to determine if a servo positioning error exists.

3. The system of claim 2 wherein said means for generating a servo positioning error signal is said servo controller.

4. The system of claim 2 wherein said means for halting operation of said hard disk controller comprises a data communications path between said servo controller and said hard disk controller.

5. The system of claim 1 wherein said memory means comprises:

a memory cell responsive to a write operation by said hard disk controller for holding a state indicative of the occurrence of said write operation.

6. The system of claim 5 wherein said memory cell comprises an addressable memory location.

7. The system of claim 5 wherein said memory cell comprises a hardware cell capable of retaining said state from said previous servo sector until said present servo sector.

8. The system of claim 7 wherein said memory cell comprises:

a first flip flop for latching the occurrence of a write operation during said previous servo sector.

9. The system of claim 8 wherein said means for generating a write gate active signal comprises:

a second flip flop for receiving the output from said first flop during said present servo sector and latching said output from said first flip flop to an output of said second flip flop wherein said output of said second flip flop is said write gate active signal and wherein said write gate active signal is enabled when a write operation occurred during said previous servo sector.

10. The system of claim 8 where said means for generating a write gate active signal comprises:

a second flip flop for receiving the output from said first flop during said present servo sector and latching said output from said first flip flop to an output of said second flip flop wherein said output of said second flip flop is said write gate active signal and wherein said write gate active signal is enabled when a write operation occurred during said previous servo sector; and an OR gate for receiving at a first input said output of said second flip flop and at a second input a signal indicating the occurrence of a write operation during said present servo sector wherein an output of said OR gate is said write gate active signal and wherein said write gate active signal is enabled when a write operation occurs during the present servo sector or a write operation occurred during the previous servo sector.

11. The system of claim 1 wherein said means responsive to said servo error positioning signal and said write gate active signal comprises:

means for conditioning said servo error positioning signal with said write gate active signal wherein said write termination signal is enabled if said servo error positioning signal is enabled and said write gate active signal is enabled during said present servo sector or said previous servo sector.

12. A method of halting operation of a hard disk controller during a servo positioning error, comprising the steps of:

storing during a previous servo sector a memory indication of whether a write operation occurred during the previous servo sector;

reading data from a servo field;

processing said servo field data to determine if a servo positioning error exists during a present servo sector;

producing, responsive to said processing step, a servo error positioning signal, if a servo positioning error exists;

generating, responsive to said memory indication, a write gate active signal if a write operation occurred during the previous servo sector or during the present servo sector;

forming, responsive to said servo error positioning signal and said write gate active signal, a write termination signal; and halting operation of said hard disk controller in response to said write termination signal.

13. The method of claim 12 wherein said storing step includes:

latching an active state in a first flip flop in response to said write operation during said previous servo sector.

14. The method of claim 13 wherein said step of generating a write gate active signal includes:

latching a second flip flop with the output from said first flop during said present servo sector wherein said output of said second flip flop is said write gate active signal and wherein said write gate active signal is enabled when a write operation occurred during said previous servo sector.

15. The method of claim 13 where said step of generating a write gate active signal comprises:

latching a second flip flop with the output from said first flop during said present servo sector;

applying an output of said second flip flop to a first input of an OR gate applying a signal indicating the occurrence of a write operation during said present servo sector to a second input of said OR gate wherein an output of said OR gate is said write gate active signal and wherein said write gate active signal is enabled when a write operation occurs during the present servo sector or a write operation occurred during the previous servo sector.

16. The method of claim 12 wherein said forming step includes:

conditioning said servo error positioning signal with said write gate active signal wherein said write termination signal is enabled if said servo error positioning signal is enabled and said write gate active signal is enabled during said present servo sector or said previous servo sector.

* * * * *